US008403002B2

(12) United States Patent
Dettinger et al.

(10) Patent No.: US 8,403,002 B2
(45) Date of Patent: Mar. 26, 2013

(54) DIRECTIONAL CONTROL FLUID VALVE

(75) Inventors: Juergen Dettinger, Unterensingen (DE); Peter Borst, Unlingen-Uigendorf (DE)

(73) Assignee: Rolf Prettl, Tuebingen (DE)

( * ) Notice: Subject to any disclaimer, the term of this patent is extended or adjusted under 35 U.S.C. 154(b) by 93 days.

(21) Appl. No.: 13/023,142

(22) Filed: Feb. 8, 2011

(65) Prior Publication Data
US 2011/0198528 A1 Aug. 18, 2011

Related U.S. Application Data

(63) Continuation of application No. PCT/EP2009/005874, filed on Aug. 13, 2009.

(30) Foreign Application Priority Data

Aug. 13, 2008 (DE) .......................... 10 2008 039 420

(51) Int. Cl.
*F15B 13/044* (2006.01)
(52) U.S. Cl. .......... 137/596.17; 137/625.43; 137/625.65
(58) Field of Classification Search .................. 137/595, 137/596.17, 596.1, 596.2, 625.43, 625.65
See application file for complete search history.

(56) References Cited

U.S. PATENT DOCUMENTS

| | | | | |
|---|---|---|---|---|
| 2,990,853 A * | 7/1961 | Sharp | .......................... | 137/625.43 |
| 4,285,497 A * | 8/1981 | Gottel | .......................... | 137/625.65 |
| 4,361,121 A * | 11/1982 | Clemens et al. | ....... | 123/198 DB |
| 4,574,841 A * | 3/1986 | Hugler | .................... | 137/596.17 |
| 4,632,082 A * | 12/1986 | Hattori et al. | .................. | 137/595 |
| 4,765,370 A * | 8/1988 | Ariizumi et al. | .......... | 137/625.65 |
| 4,934,406 A * | 6/1990 | Mayfield | .......................... | 137/595 |
| 5,139,226 A * | 8/1992 | Baldwin et al. | ........... | 137/625.65 |
| 5,275,207 A * | 1/1994 | Tonhauser et al. | ........ | 137/596.17 |
| 5,799,696 A * | 9/1998 | Weiss | .......................... | 137/625.65 |
| 5,983,941 A * | 11/1999 | Fritz et al. | .................. | 137/625.65 |
| 6,286,548 B1 * | 9/2001 | Dettmann | ................ | 137/596.17 |
| 6,880,572 B2 * | 4/2005 | Hartley | ..................... | 137/601.05 |
| 6,892,535 B2 | 5/2005 | Kim | | |
| 2003/0230082 A1 | 12/2003 | Wook | | |

FOREIGN PATENT DOCUMENTS

| | | |
|---|---|---|
| CN | 1470717 A | 1/2004 |
| DE | 4224389 | 1/1994 |
| EP | 0022264 | 1/1981 |

(Continued)

OTHER PUBLICATIONS

English translation of CN First Office Action with Search Report issued by the State Intellectual Property Office (SIPO) on Aug. 30, 2012 for CN Patent Application No. 200980140770.3.

*Primary Examiner* — John Rivell
(74) *Attorney, Agent, or Firm* — Casimir Jones SC

(57) ABSTRACT

A directional control fluid valve for establishing a first throughflow path, with which fluid is sucked in and supplied under pressure to a consumer, and a second throughflow path with which fluid is sucked out of the consumer. The valve has a housing which has a tank port, a pressure port for connecting to a pressure side of a pump, a suction port for connecting to a suction side of the pump, and a consumer port. The valve has at least one valve flap which is arranged within the housing and which can be moved between a first flap position for establishing the first throughflow path and a second flap position for establishing the second throughflow path. The housing has two parts on which are formed in each case at least two valve seats. The housing has a base part on which the tank port, the pressure port, the suction port and the consumer port are formed, and a cover part which has closed ducts. The closed ducts are connected to the associated valve seats.

13 Claims, 3 Drawing Sheets

FOREIGN PATENT DOCUMENTS

| | | |
|---|---|---|
| EP | 1013942 | 6/2000 |
| EP | 1154178 | 11/2001 |
| FR | 2842225 | 1/2004 |
| JP | 2005169183 | 6/2005 |
| WO | 2005108840 | 11/2005 |

* cited by examiner

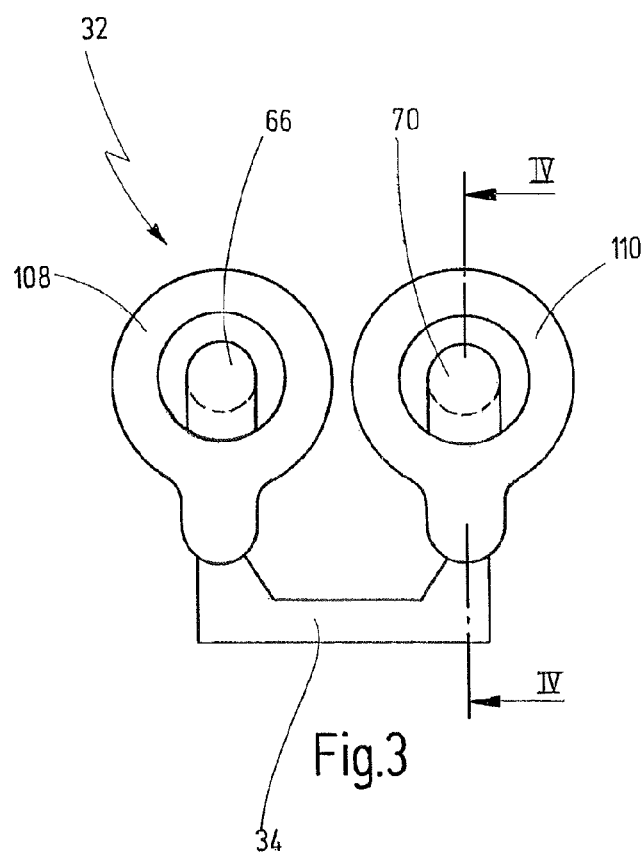
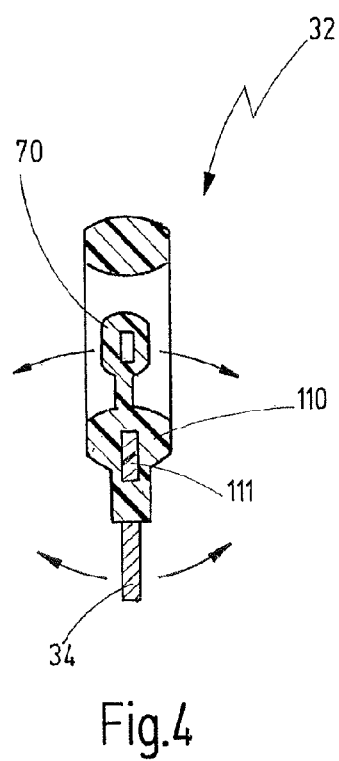

DIRECTIONAL CONTROL FLUID VALVE

CROSS-REFERENCE TO RELATED APPLICATIONS

This application is a Continuation application of International patent application PCT/EP 2009/005874, filed Aug. 13, 2009, which claims the priority of German patent application DE 10 2008 039 420, filed Aug. 13, 2008.

BACKGROUND OF THE INVENTION

The present invention relates to a directional control fluid valve for establishing a first throughflow path, with which fluid is sucked in and supplied under pressure to a consumer, and a second throughflow path, with which fluid is sucked out of the consumer, having a housing which has a tank port, a pressure port for connecting to a pressure side of a pump, a suction port for connecting to a suction side of the pump, and a consumer port, and having at least one valve flap which is arranged within the housing and which can be moved between a first flap position for establishing the first throughflow path and a second flap position for establishing the second throughflow path, with the housing having two parts on which are formed in each case at least two valve seats.

A directional control fluid valve of said type is known from document WO2005/108840 A1.

A fluid valve produced on the basis of the principles disclosed in said document has a housing with a base part on which two of the ports are provided, and a cover part on which two further ports are provided. An intermediate plate is arranged between said housing part and defines the throughflow paths by means of a relatively complex seal.

The known directional control fluid valve is of relatively large construction and has a relatively high number of components.

BRIEF SUMMARY OF THE INVENTION

In contrast, it is an object of the invention to specify an improved directional control fluid valve which in particular is of more compact construction and has fewer components.

Said object is achieved, according to a first aspect of the present invention, in that the housing has a base part on which the tank port, the pressure port, the suction port and the consumer port are formed, and a cover part which has closed ducts which are connected to the associated valve seats.

In the directional control fluid valve according to the invention, the ports are firstly more easily accessible because they are arranged on one of the housing parts. Furthermore, as a result of the cover part being formed with closed ducts, the number of components can be reduced.

In particular, the valve housing may consist exclusively of the base part and the cover part, with the base part and the cover part preferably being formed in each case in one piece. In other words, it is not necessary to provide an intermediate part for establishing the throughflow paths, such that the sealing between said intermediate part and the base part and the cover part can also be eliminated.

The object is thereby achieved in its entirety.

It is particularly preferable if the tank port, the pressure port, the suction port and the consumer port are formed on one side of the base part.

The connection of the tank, of the consumer and of the pump can be further simplified in this way.

In a further preferred embodiment, a first and a second valve chamber are formed at the interface between the base part and the cover part.

Here, the sealing between said valve chambers may preferably be realized in the manner disclosed in the above-cited WO 2005/108840 A1, specifically by virtue of annular valve chamber seals being integrally formed on the valve flap.

It is also advantageous for a first valve seat which connects the pressure port to the first valve chamber to be formed on the base part.

It is also preferable for a second valve seat which connects the suction port to the first valve chamber to be formed on the cover part.

In this way, the first valve chamber can be connected via the first and the second valve seat to the pressure port or to the suction port.

It is correspondingly preferable for a third valve seat which connects the suction port to the second valve chamber to be formed on the base part, and/or for a fourth valve seat which connects the pressure port to the second valve chamber to be formed on the cover part.

In this way, the second valve chamber can be connected via the third and the fourth valve seat either to the suction port or to the pressure port.

Here, to establish the throughflow paths, it is preferable for the valve flap to have a first blocking body which is movable within the valve chamber between the first and the second valve seat.

It is correspondingly preferable for the valve flap to have a second blocking body which is movable within the second valve chamber between the third and the fourth valve seat.

The valve flap is therefore preferably equipped with two blocking bodies which are arranged within the first and the second valve chamber respectively and which are moved synchronously corresponding to the movements of the valve flap.

In the first flap position, which constitutes a basic position, the blocking bodies preferably bear sealingly against the first valve seat and the third valve seat respectively.

In contrast, in the second flap position, the blocking bodies preferably bear sealingly against the second and the fourth valve seat respectively.

It is also preferable overall for the closed ducts to have in each case one flow reversal point, with at least one of the closed ducts being connected to the pressure port and with the cross-sectional area of the flow reversal point of said duct being no larger than the cross-sectional area of the duct section which leads from said flow reversal point to a valve seat.

In the region of the flow reversal point, the pressurized fluid exerts a force in the direction for lifting the cover part from the base part. By limiting the cross-sectional area of said flow reversal point to a required dimension, said force can be reduced to the greatest possible extent. This has the result that the expenditure for sealing the base part with respect to the cover part can be reduced, since the forces in the lifting direction can be reduced by means of this measure.

In a further embodiment which is preferable overall, the closed ducts have in each case one flow reversal point, with at least one of the closed ducts being connected to the pressure port, and with a duct section which leads from the pressure port to the flow reversal point being aligned obliquely.

By means of said measure, it is possible for the fluid to be conducted to the flow reversal point obliquely at an angle, such that it is possible to reduce the cross-sectional area of the flow reversal point to the greatest possible extent. Here, the oblique duct section is preferably formed so as to open out directly into the flow reversal point.

Here, it is preferable for the duct section which leads from the pressure port to the flow reversal point to be aligned at an angle of greater than 45°, preferably greater than 60°, with respect to a parting plane between the base part and the cover part.

By means of said measure, it can be achieved that the forces which act perpendicular to the parting plane and in a direction for lifting the cover part from the base part are minimized to the greatest possible extent (the projected pressure area is minimized).

Furthermore, the housing shape can be kept compact in this way.

According to a second aspect of the present invention, the above object is achieved by means of a directional control fluid valve which has a first and a second valve chamber, with a valve flap which is movable between a first and a second flap position having a first and second blocking body, which blocking bodies are arranged within the first and second valve chambers respectively, with it being possible, in at least one of the flap positions, for the blocking bodies to be acted on with pressurized fluid from different sides, and with the valve seats, which are assigned to said flap position, of the first and second valve chambers respectively and/or the blocking bodies being designed such that the valve flap is pushed into said flap position by means of the pressurized fluid.

By means of said embodiment, it can be achieved that the fluid pressure is used to push the valve flap into said one flap position. In this way, the valve flap can be held in a self-holding manner, so to speak, in said one flap position, which is preferably a basic position of the directional control fluid valve. As an alternative to this, the fluid pressure may be used to assist a force imparted by an actuator. The actuator is however preferably used only to place the valve flap into said one flap position, with it being possible, if appropriate, for the actuator to be deactivated after the pump is activated, since the flap position thus established is held by the fluid pressure.

Here, it is particularly advantageous if, in said one flap position, the blocking bodies bear against the respective valve seats of the first valve chamber and of the second valve chamber, wherein the areas, which are subjected to pressure loading, on said valve seats are of different sizes.

In this way, one blocking body is pressed against the valve seat with a greater force than the force with which the other blocking body is pushed away from the other valve seat. This is because the force exerted on the blocking bodies is dependent not only on the pressure but also on the area which is subjected to pressure loading.

It is self-evident that the features specified above and the features yet to be explained below can be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description, in which:

FIG. 3 shows a plan view of a valve flap as can be used in the directional control fluid valve according to the invention;

FIG. 4 shows a sectional view along the line IV-IV of FIG. 3; and

DETAILED DESCRIPTION OF THE INVENTION

Figure 1:
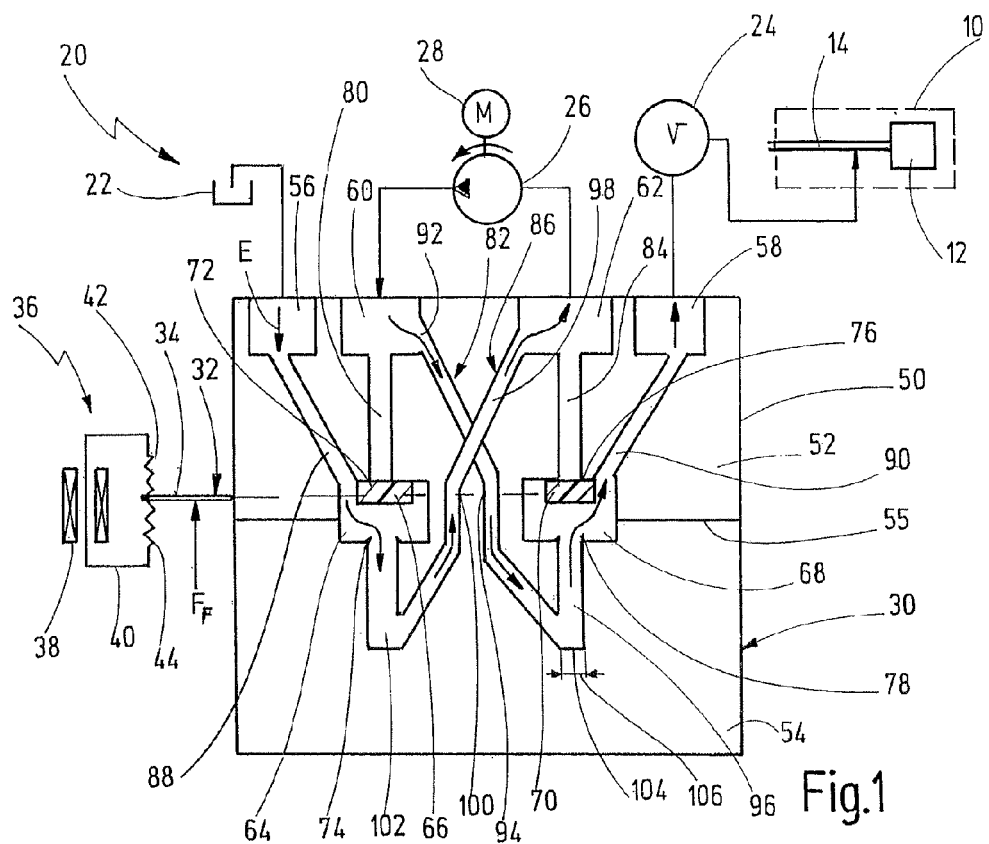
FIG. 1 shows a schematic illustration of a motor vehicle having a urea injection system which has a directional control fluid valve according to the invention, with the directional control fluid valve being shown in a first flap position.

In FIG. 1, a motor vehicle is denoted schematically by 10. The motor vehicle 10 has an internal combustion engine 12, the exhaust gases of which are discharged via an exhaust system 14.

The vehicle 10 is also assigned a urea injection system 20 by means of which urea can be injected into the exhaust system 14 for the reduction of nitrogen.

The technical principles of a urea injection system of said type are generally known and therefore, in order to provide a compact illustration, will not be described here.

The urea injection system 20 has a urea tank 22 in which a relatively large quantity of urea can be accommodated. The urea injection system 20 also has a urea injection valve 24 which constitutes a fluid consumer and by means of which the urea can be injected into the exhaust system 14.

Urea is a fluid which can freeze at low temperatures such as are regularly experienced by motor vehicles. It is therefore imperative for the urea injection system 20 to be emptied after the internal combustion engine 12 is shut down, with urea which is situated in the urea injection system 20 being pumped back into the urea tank 22.

To inject the urea by means of the urea injection valve 24 and also to empty the urea injection system 20 by suction, a pump 26 is used which is preferably of unidirectional design. The pump 26 is driven on demand by means of a pump motor 28 (for example of an electric motor).

To be able firstly to supply the urea to the urea injection valve 24 under pressure and secondly to pump the urea out of the urea injection system 20, a directional control fluid valve 30 is provided which, in the present case, is designed as a 4/2 directional control valve.

Figure 2:
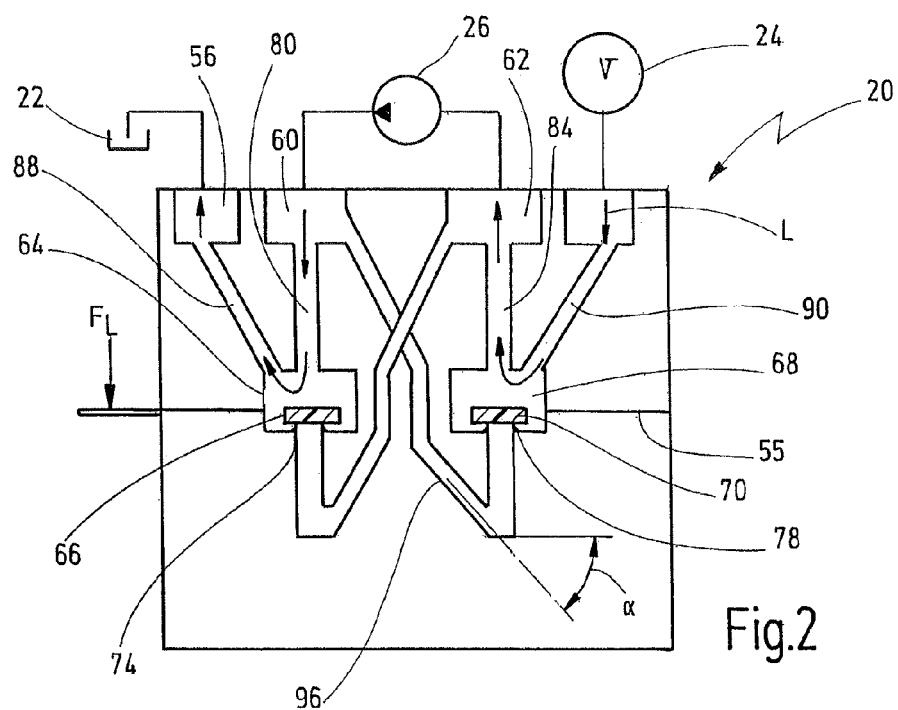
FIG. 2 shows an illustration, corresponding to FIG. 1, of the directional control fluid valve in the second flap position.

The directional control fluid valve 30 is furthermore designed as a flap valve with a valve flap 32 which can be moved back and forth between a first flap position (basic position) shown in FIG. 1 and a second flap position shown in FIG. 2. To move the valve flap 32 back and forth, a flap lever 34 is provided which extends out of the directional control fluid valve 30 and which can be actuated by means of a valve actuator 36.

The valve actuator 36 preferably has an electromagnetic actuator 38 which can move an armature 40. The armature 40 is coupled via a first spring 42 to the flap lever 34. Furthermore, the armature 40 is coupled via a second spring 44 to the flap lever 34.

By means of the spring couplings, it is achieved that the flap lever 34 is subjected in each case not to the full actuator force but rather to a force resulting from the respective spring constants of the springs 42, 44. Accordingly, the possibility of excessively high forces being exerted on the valve flap 32 is eliminated.

The directional control fluid valve 30 has a housing 50 which is composed preferably only of a base part 52 and a cover part 54. The base part 52 and the cover part 54 are connected to one another via a parting plane 55.

A consumer port 58 which is connected to the urea injection valve 24 is provided on the base part 52. A pressure port 60 for connecting to a pressure side of the pump 26 and a suction port 62 for connecting to a suction side of the pump 26 are also provided on the base part 52. Finally, a tank port 56 for connecting to the urea tank 22 is provided on the base part 52.

A first valve chamber 64 within which a first blocking body 66 of the valve flap 32 is movable between the first flap position and the second flap position is provided in the housing 50. A second valve chamber 68 within which a second blocking body 70 of the valve flap 32 is movable between the first and the second flap position is also provided in the housing 50. The valve chambers 64, 68 are arranged in the housing 50 in such a way that the parting plane 55 runs through the valve chambers 64, 68.

As will be described again below, the blocking bodies 66, 70 are both integrally formed on the valve flap 32 and consequently move synchronously with one another between the first flap position and the second flap position.

A first valve seat 72 and a second valve seat 74 are formed in the first valve chamber 64. The first blocking body 66 is movable back and forth between the first valve seat 72 and the second valve seat 74. In a corresponding way, a third valve seat 76 and a fourth valve seat 78 are formed in the second valve chamber 68, between which the second blocking body 70 can move back and forth. The first valve seat 72 and the third valve seat 76 are provided on the base part 52. The second valve seat 74 and the fourth valve seat 78 are provided on the cover part 54.

The pressure port 60 is connected via a first pressure port duct 80 to the first valve seat 72.

A second pressure port duct 82 connects the pressure port 60 to the fourth valve seat 78. Here, the second pressure port duct 82 runs both through the base part 52 and through the cover part 54.

A first suction port duct 84 connects the suction port 62 to the third valve seat 76. A second suction port duct 86 connects the suction port 62 to the second valve seat 74, with the second suction port duct 86 running both through the base part 52 and through the cover part 54.

A tank duct 88 connects the tank port 56 to the first valve chamber 64, specifically independently of the position of the blocking bodies 66, 70. A consumer duct 90 connects the consumer port 58 to the second valve chamber 68, specifically independently of the position of the second blocking body 70.

The second pressure port duct 82 has a first connecting duct 92 which extends obliquely from the pressure port 60 to a first transition point 94 in the region of the parting plane 55. In the cover part 54, a first closed duct 96 is formed which extends from the first transition point 94 firstly in a direction perpendicular to the parting plane 55 and subsequently in a direction obliquely with respect thereto, before subsequently running back to the fourth valve seat 78.

The second suction port duct 86 has a second connecting duct 98 which extends from the suction port 62 in a direction obliquely with respect to the parting plane 55 to a second transition point 100 in the region of the parting plane 55. A second closed duct 102 which connects the second transition point 100 to the second valve seat 74 is formed in the cover part 54. The second closed duct 102, too, is designed so as to run from the second transition point 100 initially in a direction perpendicular to the parting plane 55 and subsequently obliquely with respect thereto, with the second closed duct 102 subsequently running back in the direction of the parting plane 55 to the second valve seat 74.

During operation of the pump 26, pressurized fluid is permanently present in the first closed duct 96. Here, in particular when the blocking body 70 bears against the fourth valve seat 78 (see FIG. 2), it is possible on account of the flow reversal point 104, at which the fluid flow away from the parting plane 55 is reversed back toward the parting plane 55, for axial forces to arise which push the cover part 54 away from the base part 52. Here, said axial forces can however be limited in that the flow reversal point 104 of the first closed duct 96 has a very small cross-sectional area 106 which is preferably no larger than the cross-sectional area of the duct section which connects the flow reversal point 104 to the fourth valve seat 78.

Furthermore, the duct section which leads from the first transition point 94 to the flow reversal point 104 extends obliquely such that it opens out into the flow reversal point 104 and therefore does not increase the size of the area on which the pressurized fluid can act.

In this regard, it is also shown in FIG. 2 that that duct section of the closed duct 96 which leads from the transition point 94 to the flow reversal point 104 is inclined with respect to the parting plane 55, specifically by an angle $\alpha$. The angle a should be greater than 45°, preferably greater than 60°.

By means of said measure, the axial force with which the pressurized fluid pushes the cover part 54 away from the base part 52 can be reduced or minimized.

The directional control fluid valve 30 may be operated as follows. In the basic position shown in FIG. 1, in which the valve flap 32 is situated in the first flap position, the blocking bodies 66, 70 press against the valve seats 72, 76. In this way, the first valve chamber 64 is connected to the suction port 62 and the second valve chamber 68 is connected to the pressure port 60.

During operation of the pump 26, it is consequently possible for fluid to be supplied from the urea tank 22 to the urea injection valve 24 via the tank port 56, the tank duct 88, the first valve chamber 64, the second closed duct 102, the second connecting duct 98, the suction port 62, the pump 26, the pressure port 60, the first connecting duct 92, the first closed duct 96, the second valve chamber 68, the consumer duct 90 and the consumer port 58. The above-described throughflow path is denoted by E and indicated by corresponding arrows in FIG. 1.

By means of the injection of urea into the exhaust system 14, the exhaust gas can be purified, in particular freed from nitrogen oxides. It is self-evident that urea is "consumed" in this way, such that after a certain operating duration, the urea tank 22 may need to be re-filled.

Here, the pump 26 can generate a very high pressure, for example in the region of 9 bar, such that with corresponding nozzle design, the urea can be injected into the exhaust system 14 at very high pressure and consequently in finely atomized form, and consequently with high efficiency.

To establish the above-described first flap position, the valve actuator 36 is used, by means of which a force FF can be exerted on the valve flap 32. As will be described again below, the first flap position may also be configured to be self-holding, with the fluid pressure generated by the pump 26 serving to hold the valve flap 32 in the first flap position.

When the vehicle 10 is shut down, it is necessary to empty the urea injection system 20 and pump the urea back into the tank 22.

For this purpose, as shown in FIG. 2, the valve actuator 36 is actuated such that an opposing force FL is exerted on the valve flap 32. In this way, the valve flap 32 is pushed into the second flap position, in which the first blocking body 66 bears against the second valve seat and the second blocking body 70 bears against the fourth valve seat 78. In this way, the first valve chamber 64 is connected to the pressure port 60. The second valve chamber 68 is connected to the suction port 62.

Consequently, during operation of the pump 26, fluid can be pumped from the urea injection valve 24 back into the tank 22 via the consumer port 58, the consumer duct 90, the second valve chamber 68, the first suction port duct 84, the suction port 62, the pump 26, the pressure port 60, the first pressure port duct 80, the first valve chamber 64, the tank duct 88 and the tank port 56. The throughflow path established here is denoted by L and indicated by arrows in FIG. 2.

FIGS. 3 and 4 schematically show a valve flap 32 which is preferably used in a directional control fluid valve 30 according to the invention.

The valve flap 32 has a flap lever 34 which may for example extend out of the housing 50 and which may be engaged on directly or indirectly by a valve actuator 36. The flap lever 34 has a first web which extends into the interior of the housing 50 and which, at its end, bears the first blocking body 66. Correspondingly, the flap lever 34 has a second web which extends into the housing 50 and which, at its free end, bears the second blocking body 70.

A first valve chamber seal 108 and a second valve chamber seal 110 are also integrally formed on the flap lever 34. The valve chamber seals 108, 110 are in each case of annular design such that they can seal off the valve chambers 64, 68 in the region of the parting plane 55 (as shown for example in FIG. 5).

Here, the valve flap 32 is designed such that the blocking bodies 66, 70 are pivoted, specifically about a pivot axis 111 which is shown in FIG. 4, synchronously with movements of that part of the flap lever 34 which extends out of the housing 50. The flap lever 34 is therefore formed as a two-sided lever about the pivot axis 111. Furthermore, the blocking bodies 66, 70 are mechanically connected to one another by means of the flap lever 34, such that forces acting on one blocking body 66 are transmitted via the flap lever 34 to the other blocking body 70 and vice versa.

Figure 5:
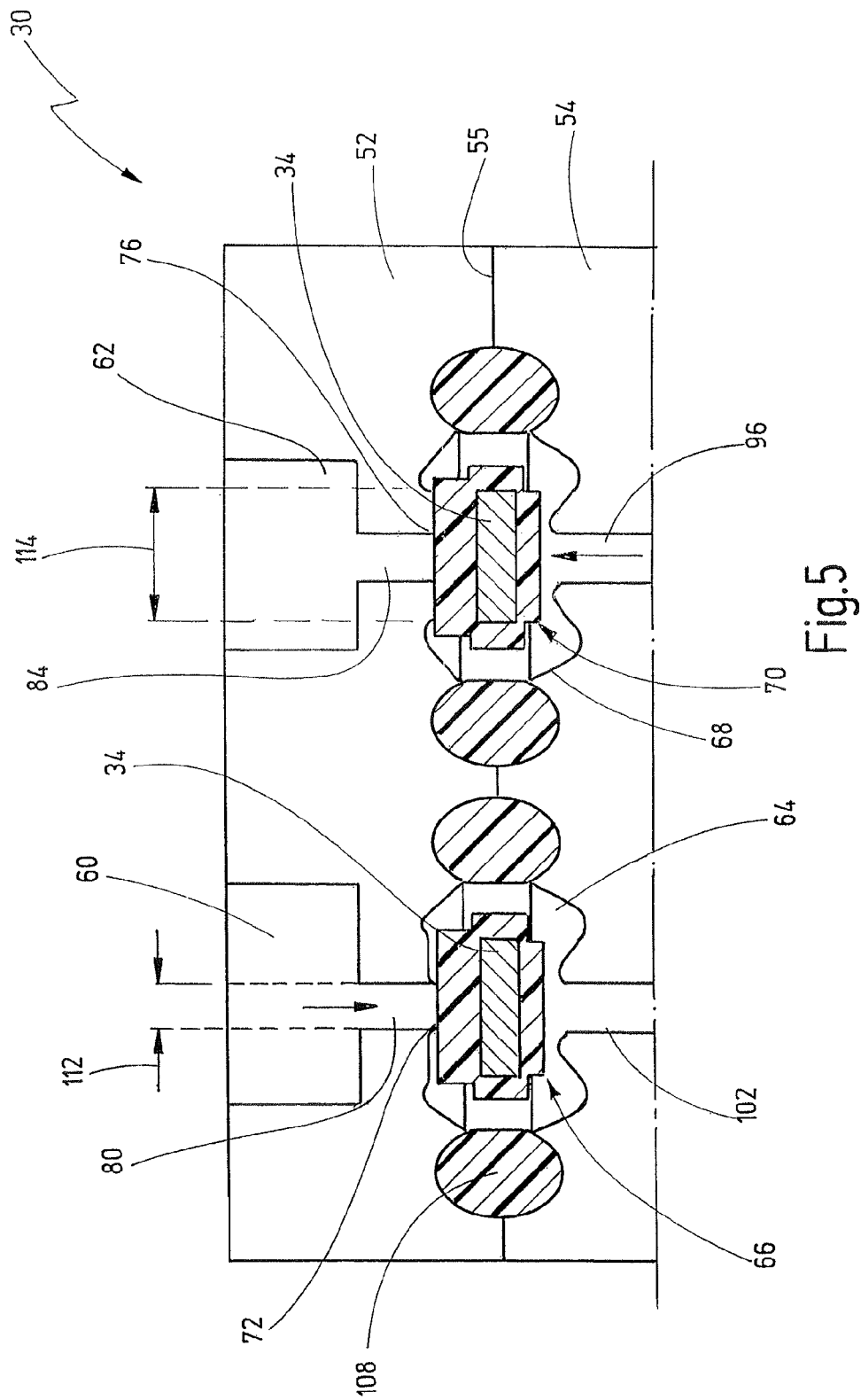
FIG. 5 shows a schematic view, similar to FIG. 1, of a directional control fluid valve according to the invention in the first flap position.

FIG. 5 schematically shows a detail of a directional control fluid valve 30 according to the invention, the design and function of which generally corresponds to the directional control fluid valve 30 described in FIGS. 1 and 2. Identical elements are therefore denoted by the same reference numerals. Only differences will be explained below.

The valve flap 32 is of similar design, in terms of construction and function, to the valve flap 32 shown in FIGS. 3 and 4.

FIG. 5 also shows that the first valve seat 72 and the third valve seat 76, against which the blocking bodies 66, 70 bear in the first flap position, are of different design. In the first flap position (which corresponds to the state of FIG. 1), the first blocking body 66 must seal off the first valve seat 72 with respect to the fluid pressure provided at the pressure port 60. The pressure acting on the first blocking body 66 is indicated in FIG. 5 by an arrow. A fluid pressure of equal magnitude acts on the second blocking body 70 but in the opposite direction, as likewise indicated in FIG. 5 by an arrow.

Here, the valve seats 72, 76 are of different design, in such a way that the pressure acting on the first blocking body 66 exerts a load on the first area 112, which substantially corresponds to the cross section of the first pressure port duct 80.

The third valve seat 76 is shaped such that the pressure acting on the second blocking body 70 exerts a load on a second area 114 which is considerably larger than the first area 112 which is subjected to pressure loading. Since the force exerted on the blocking bodies 66, 70 in each case constitutes a product of the pressure and the area 112, 114 which is subjected to pressure loading, a greater overall force is exerted on the valve flap 32 in the direction of the first flap position shown in FIG. 5 than in the opposite direction. Since the two blocking bodies 66, 70 are rigidly connected to one another by means of the flap lever 34, the valve flap 32 is consequently held in the first flap position shown in FIG. 5 solely on account of the fluid pressure.

What is claimed is:

1. A directional control fluid valve for establishing a first throughflow path, with which fluid is sucked in and supplied under pressure to a consumer, and a second throughflow path, with which fluid is sucked out of the consumer, having a housing which has a tank port, a pressure port for connecting to a pressure side of a pump, a suction port for connecting to a suction side of the pump, and a consumer port, and having at least one valve flap which is arranged within the housing and which can be moved between a first flap position for establishing the first throughflow path and a second flap position for establishing the second throughflow path, with the housing having two parts on which are formed in each case at least two valve seats, wherein the housing has a base part on which the tank port, the pressure port, the suction port and the consumer port are formed, and a cover part which has closed ducts which are connected to the associated valve seats.

2. The directional control fluid valve as claimed in claim 1, wherein the tank port, the pressure port, the suction port and the consumer port are formed on one side of the base part.

3. The directional control fluid valve as claimed in claim 1, wherein a first and a second valve chamber are formed at the interface between the base part and the cover part.

4. The directional control fluid valve as claimed in claim 3, wherein a first valve seat which connects the pressure port to the first valve chamber is formed on the base part.

5. The directional control fluid valve as claimed in claim 3, wherein a second valve seat which connects the suction port to the first valve chamber is formed on the cover part.

6. The directional control fluid valve as claimed in claim 3, wherein a third valve seat which connects the suction port to the second valve chamber is formed on the base part.

7. The directional control fluid valve as claimed in claim 3, wherein a fourth valve seat which connects the pressure port to the second valve chamber is formed on the cover part.

8. The directional control fluid valve as claimed in claim 4, wherein a second valve seat which connects the suction port to the first valve chamber is formed on the cover part, wherein the valve flap has a first blocking body which is movable within the first valve chamber between the first and the second valve seat.

9. The directional control fluid valve as claimed in claim 6, wherein a fourth valve seat which connects the pressure port to the second valve chamber is formed on the cover part, wherein the valve flap has a second blocking body which is movable within the second valve chamber between the third and the fourth valve seat.

10. The directional control fluid valve as claimed in claim 1, wherein the closed ducts have in each case one flow reversal point, with at least one of the closed ducts being connected to the pressure port and with the cross-sectional area of the flow reversal point of said duct being no larger than the cross-sectional area of the duct section which leads from said flow reversal point to a valve seat.

11. The directional control fluid valve as claimed in claim 1, wherein the closed ducts have in each case one flow reversal point, with at least one of the closed ducts being connected to the pressure port, and with a duct section which leads from the pressure port to the flow reversal point being aligned obliquely.

12. The directional control fluid valve as claimed in claim 11, wherein the duct section which leads from the pressure port to the flow reversal point being aligned at an angle of greater than 45° with respect to a parting plane between the base part and the cover part.

13. A directional control fluid valve having a first and a second valve chamber, with a valve flap which is movable between a first and a second flap position and which has a first and second blocking body arranged within the first and second valve chambers respectively, in at least one of the flap positions, the blocking bodies are acted on with pressurized fluid from different sides, and with at least one of the valve seats, which are assigned to said one flap position, of the first and second valve chambers respectively, and the blocking bodies arranged such that the valve flap is pushed into said one flap position by means of the pressurized fluid, wherein, in said one flap position, the blocking bodies bear against the respective valve seats of the first valve chamber and of the second valve chamber respectively, wherein the areas, which are subjected to pressure loading, on said valve seats are of different sizes.

* * * * *